United States Patent [19]
Tsukuda

[11] Patent Number: 5,983,086
[45] Date of Patent: Nov. 9, 1999

[54] PORTABLE INFORMATION TERMINAL DEVICE WITH RADIO SELECTIVE-CALLING RECEIVER

[75] Inventor: Naoki Tsukuda, Tokyo, Japan

[73] Assignee: NEC Corporation, Tokyo, Japan

[21] Appl. No.: 08/855,917

[22] Filed: May 14, 1997

[30] Foreign Application Priority Data

May 15, 1996 [JP] Japan .................................... 8-119412

[51] Int. Cl.$^6$ ................................................. H04B 17/02
[52] U.S. Cl. ........................... 455/132; 455/101; 455/137
[58] Field of Search ............. 455/63, 101, 102, 455/67.3, 67.4, 500, 501, 66, 526, 130, 132, 134, 135, 136, 137, 138, 557, 179.1, 180.1, 226.1–226.3, 272, 277.1, 278.1

[56] References Cited

U.S. PATENT DOCUMENTS

| | | | |
|---|---|---|---|
| 5,203,018 | 4/1993 | Hirose | 455/101 |
| 5,448,766 | 9/1995 | Sanning et al. | 455/67.1 |
| 5,546,397 | 8/1996 | Mahany | 455/101 |
| 5,574,981 | 11/1996 | Ahonen | 455/67.4 |
| 5,819,182 | 10/1998 | Gardner et al. | 455/101 |

FOREIGN PATENT DOCUMENTS 61-198825   9/1986   Japan.

*Primary Examiner*—Reinhard J. Eisenzopf
*Assistant Examiner*—Edan Orgad
*Attorney, Agent, or Firm*—Scully, Scott Murphy & Presser

[57] ABSTRACT

A portable information terminal device with a radio selective-calling receiver including first and second receiver sections with first and second antennas, respectively, implements an improvement of the reception sensitivity deterioration caused by the noise of a personal computer attached to the device with any increase of the dissipation current generated by the receiver maintained at a minimum. Only when the portable information terminal device is connected to the personal computer will it operate in a diversity reception mode to implement both receiving sections, improving reception sensitivity deterioration. When the portable information terminal device is not connected to the personal computer, diversity reception is not implemented, thus permitting only one of the receiving sections to receive.

12 Claims, 4 Drawing Sheets

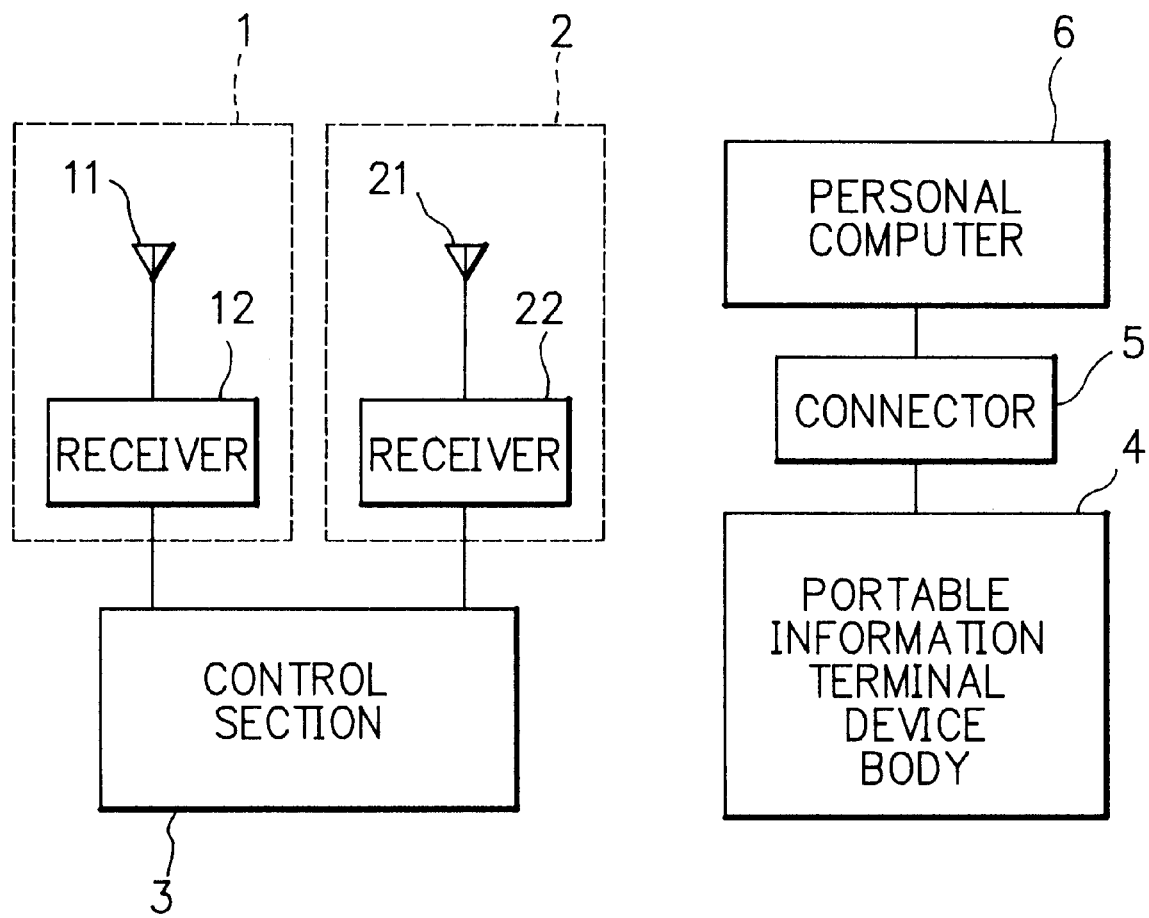

F I G. 2A
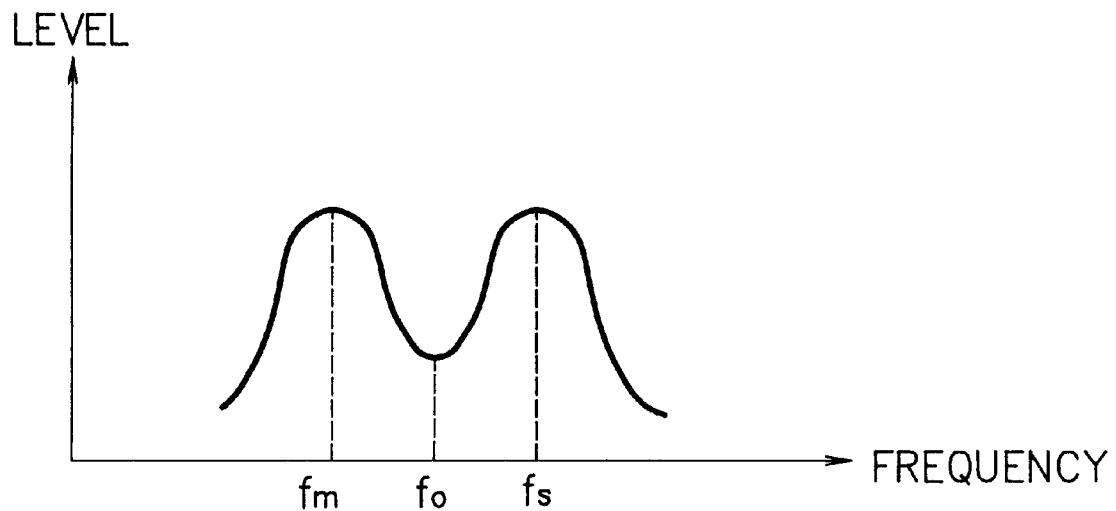
F I G. 2B
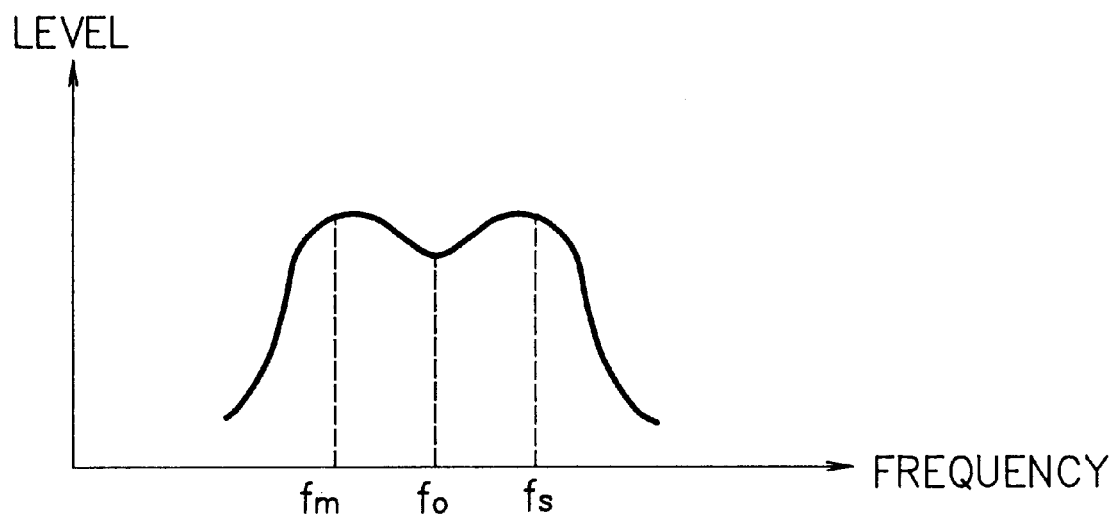

PORTABLE INFORMATION TERMINAL DEVICE WITH RADIO SELECTIVE-CALLING RECEIVER

BACKGROUND OF THE INVENTION

The present invention relates to a portable information terminal device with a radio selective-calling receiver. More to particularly the present invention relates to a portable information terminal device with a radio selective-calling receiver which is connected to be used to a computer such as a personal computer or the like.

DESCRIPTION OF THE PRIOR ART

In general, an operation section of a portable information terminal device is hard to operate, because a button or a key thereof is too small and the number thereof do not have many. However, a portable information terminal device connectable to a personal computer is capable of being operated simply using keyboard of the personal computer equipped therewith. In recently, a portable information terminal device with a radio selective-calling receiver such as an electronic pocket book and so forth increases in number.

There is the portable information terminal device with the radio selective-calling receiver in which an operation for the portable information terminal device, and a preparation or an editirg of address book, and so forth are capable of being performed by inserting the connecting portion thereof into the extended slot of the personal computer. In the portable information terminal device with the radio selective-calling receiver, it might be thought that receiving sensitivity deteriorates under the influence of noise generated in the personal computer connected thereto.

The problem of noise might be resolved in such a way that it permits an antenna of the portable information terminal device to locate to a place where is hard to suffer an influence of noise. As a practical matter, a place of the extended slot namely a place of the portable information terminal device as against the noise source exists in various points, because of various kinds of the personal computer. Thereby, it is hard to locate the antenna to the place which is hard to suffer the influence of noise in any personal computer connected thereto. Furthermore, the noise source which exceedingly affects the portable information terminal device possibly changes with time caused by for example, movement of a floppy disk drive and so forth.

In the Japanese Patent Application Laid-Open No. SHO 61-198825, the technic for improving the receiving sensitivity deterioration is disclosed. According to the technic for improvement, a diversity system is proposed as the system should be adopted. In the diversity system, as shown in FIG. 1, it permits S/N (signal-to-noise ratio) or level of signal of two systems to be compared so that signal is switched to either system in such a way that signal with better S/N or large level is selected.

In FIG. 1, each signal received by antennas 11, 21 of receiving sections 1, 2 is amplified by amplifiers 12, 22, thus to be sent to control section 3. In the control section 3, each S/N of the receiving signals is compared to each other, and then a signal with better S/N is selected to be processed. Thereby the receiving sensitivity is improved. The control section 3 is connected to the portable information terminal device body 4, and the portable information terminal device body 4 is capable of being connected to a personal computer 6 through a connector 5.

A message or the like received by the receiving section is displayed on a display (not illustrated) of the portable information terminal device body 4 when the personal computer 6 is not connected to the connector 5 of the portable information terminal device body 4. Also the message or the like can be displayed on a display of the personal computer 6 when the personal computer 6 is connected to the connector 5.

FIG. 2A is a view showing a signal spectrum of FSK (frequency shift keying) modulated wave, and fm denotes mark-frequency, and fs denotes space-frequency. Sign fo is central frequency between fm and fs. When S/N of received radio wave deteriorates, fo-component existing in common noise area between fm and fs increases, so that spectrum is changed as FIG. 2B. Consequently, the discrepancy between fm and fs component (S) and fo component (N) is used as S/N.

However, in general when the diversity reception is implemented, dissipation current of reception system increases. In particular, since two receivers are used at all times as above-stated case, the dissipation current approximately doubles as against the case where the diversity reception is not implemented. Namely, in cases where a function for radio selective-calling is only used, and another function of the portable information terminal device is not used, the battery life decreases by approximately one-half as against the case where the diversity reception is not implemented.

SUMMARY OF THE INVENTION

In view of the foregoing, it is an object of the present invention to provide a portable information terminal device with a radio selective-calling receiver for improving reception sensitivity deterioration caused by the noise of the personal computer with increasing of the dissipation current controlled.

According to one aspect of the present invention, for achieving the above-mentioned object, there is provided a portable information terminal device with a radio selective-calling receiver which comprises a first and a second radio receiving sections, and control means for controlling power source of the first and the second radio receiving sections together into ON-state when the first and the second radio receiving section is connected to the computer device, meanwhile the control means for controlling power source of one of the first and the second radio receiving sections selectively into ON-state when the first and second radio receiving section is not connected to the computer device.

According to another aspect of the invention, in the above first aspect, the control means comprises means for detecting connection condition of the connector, and means for performing ON/OFF control of a power source of the first and the second radio receiving sections in accordance with detection result of the detection means, wherein the control means controls the power source of the first and the second radio receiving section together into ON-state, when the portable information terminal device is connected to the computer device and the computer device is ON-state, while the control means controls the power source of one of the first and the second radio receiving section selectively into ON-state, when the computer device is OFF-state.

According to another aspect of the invention, in the above first aspect, the control means further comprises means for detecting ON/OFF state of the power source of the computer device, and means for controlling ON/OFF control of the power source of the first and the second radio receiving section in accordance with the detection result of the detection means.

According to another aspect of the invention, in the above first aspect, the portable information terminal device with the radio selective-calling receiver further comprises means for receiving power supply from the power source of the computer device when the portable information terminal device with the radio selective-calling receiver is connected to the computer device.

As stated above, in the portable information terminal device with the radio selective-calling receiver which is inserted into the extended slot of the personal computer to be employed, it is anticipated that the reception sensitivity is deteriorated caused by the noise generated by the personal computer. In the present invention, when such reception sensitivity deterioration occurs, namely only when the portable information terminal device connected to the personal computer is employed, it permits the diversity reception to implement. As a result, there is the effect that the receiving sensitivity deterioration caused by the noise of the personal computer can be improved. The time required for the portable information terminal device to be used by connecting the personal computer therewith is a little period in comparison with whole employment period of the portable information terminal device. Accordingly, an increase of dissipation current due to the diversity reception scarcely affects the battery life. It does not permit the diversity reception to implement when the portable information terminal device is not connected to the personal computer or the power source of the personal computer connected thereto is OFF state. It permit the reception to implement at the receiving section (antenna) which is hard to suffer an influence of the noise generated by the portable information terminal device itself. Another power source of the receiving section is switched OFF, thus the increase of dissipation current is prevented.

It does not permits the radio selective-calling receiver to implement the diversity reception at all times. Only when the portable information terminal device is connected to the personal computer to be used, the diversity reception is implemented, with the result that it becomes possible to prevent the increase of dissipation current namely deterioration of battery life, with the reception sensitivity deterioration improved. Besides, when the personal computer is connected to the portable information terminal device, if a power source is supplied from the side of the personal computer, the increase of the dissipation current due to the diversity reception does not affect the battery life at all.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 1 is a block diagram showing a conventional example;

FIGS. 2A and 2B are views showing spectrum of FSK modulated wave;

DETAILED DESCRIPTION OF THE PREFERRED EMBODIMENTS

A preferred embodiment of the present invention will now be described in detail referring to the accompanying drawings.

Figure 3:
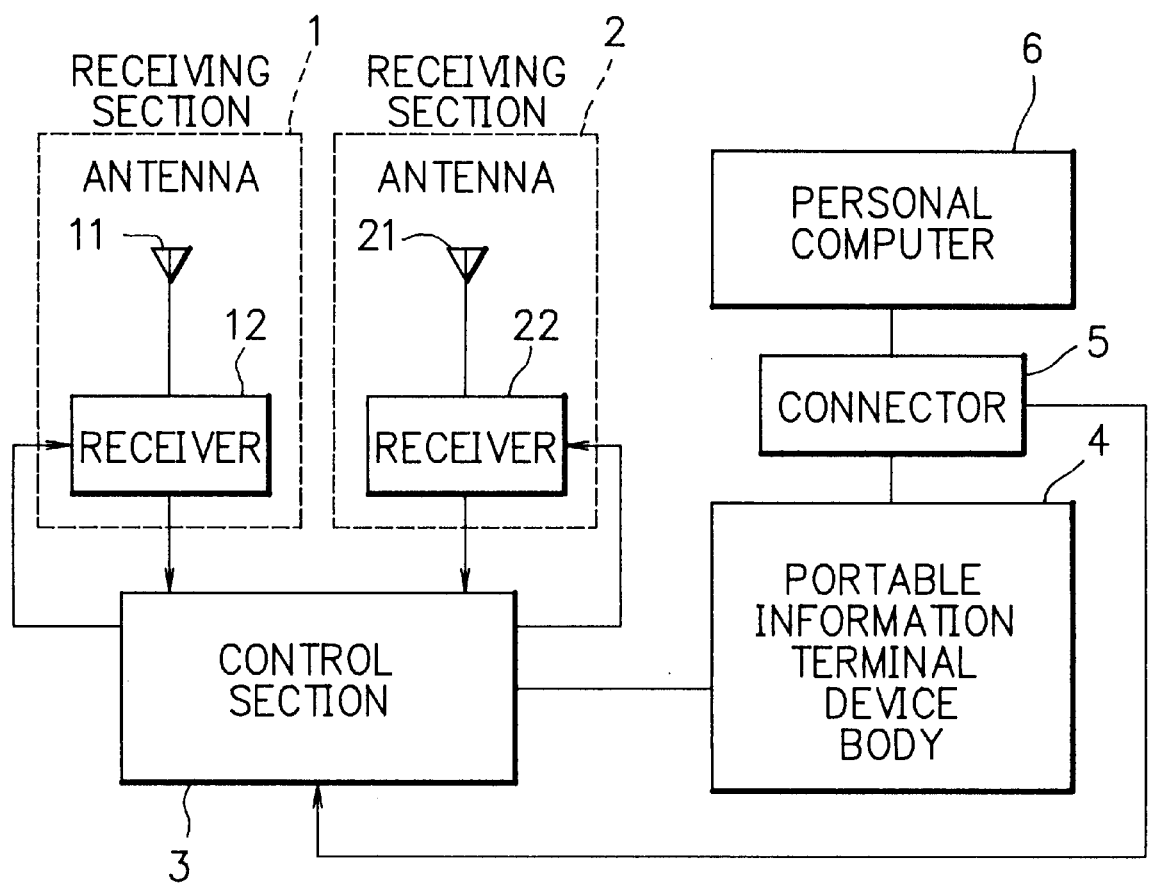
FIG. 3 is a block diagram showing one embodiment according to the present invention.

FIG. 3 is a structural view of a portable information terminal device with a radio selective-calling receiver for explaining one embodiment of the present invention. The same portions as those of FIG. 1 are shown by the same signs. Referring to FIG. 3, two radio receiving sections 1, 2 are provided, and each receiving section is composed of antennas 11, 21. Each receiving signal is inputted to a control section 3.

The control section 3 forwards each receiving signal to the portable information terminal device body 4. The control section 3 detects connecting condition or the like of a connector 5, so that the control section 3 performs ON/OFF control of power source of the receiving sections 1, 2 in response to the detection result.

The connector 5 is used for connecting the portable information terminal device body 4 to the personal computer 6. Detection for ON/OFF of power supply of the personal computer or connection to the personal computer is judged whether or not required voltage is supplied to the connector 5 from the personal computer 6.

Figure 4:
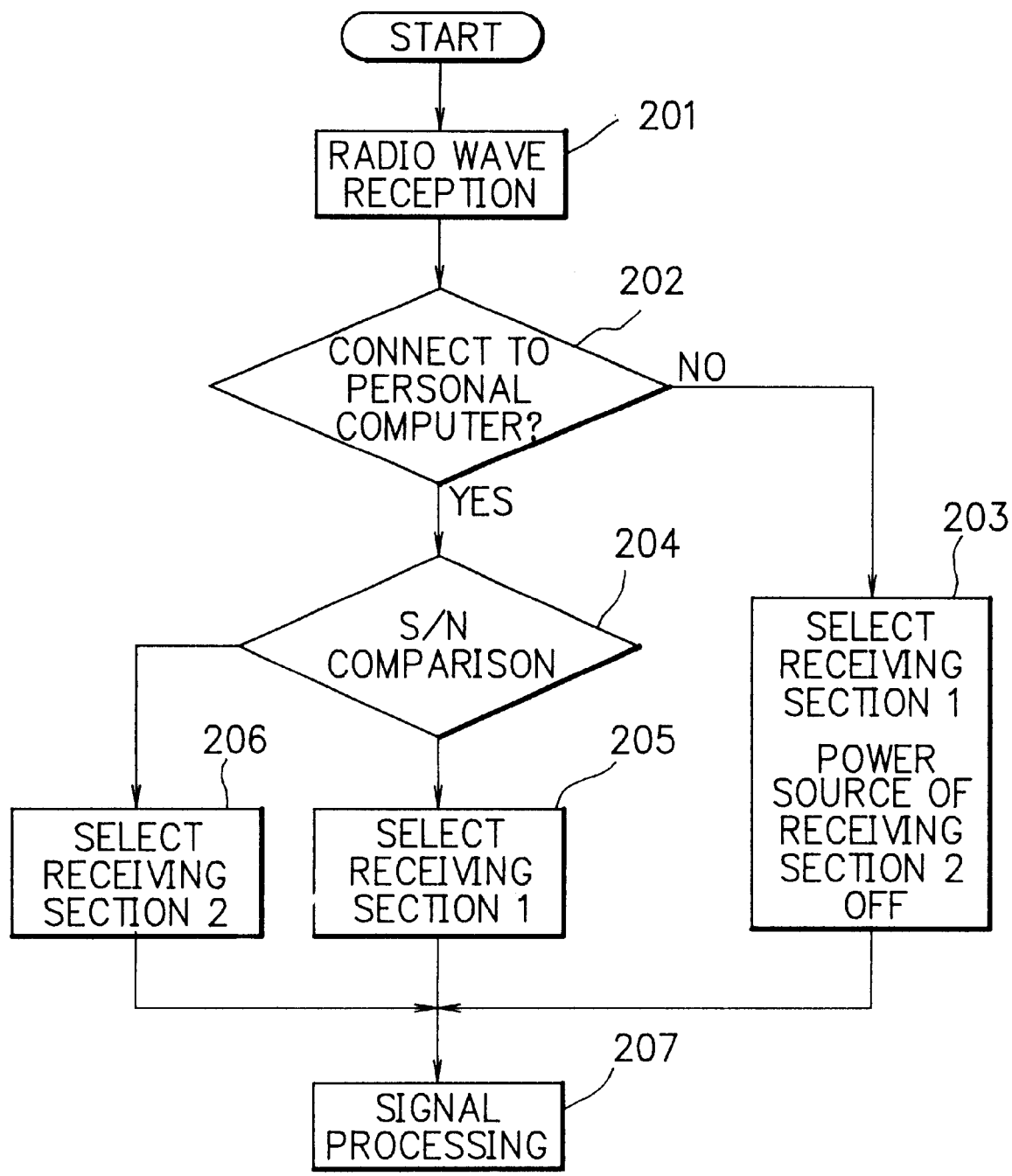
FIG. 4 is a flow chart showing an operation according to the present invention.

FIG. 4 is a flow chart showing operation including the control section 3 of FIG. 3. Referring to FIG. 4, an electric radio wave is received (STEP 201), when the personal computer 6 is not connected to the connector 5 (STEP 202), the control section 3 selects the receiving section 1, thus causing the power source of the receiving section 2 to switch off (STEP 203). Thus it permits reception of the message to notify by sound or the like, before displaying the message on the display of the portable information terminal device body 4 (STEP 207).

When the personal computer 6 is connected to the connector 5, the control section 3 compares S/N of the signal received by the receiving section 1 with S/N of the signal received by the receiving section 2 (STEP 204), thus selecting the signal with better S/N (STEP 205 or 206). The control section 3 displays the message or the like on the display of the personal computer 6 (STEP 207).

Whole the portable information terminal device including the receiving sections 1, 2, and the control section 3 are supplied with the power source supply through the connector 5 from the personal computer 6 when the portable information terminal device is connected to the personal computer 6 so that battery life thereof becomes long.

As stated above, according to the present invention, only when the portable information terminal device connected to the personal computer is employed, it permits the diversity reception to implement. As a result, there is the effect that the reception sensitivity deterioration caused by the noise of the personal computer can be improved. The time required for the portable information terminal device to be used by connecting the personal computer therewith is a little period in comparison with whole employment period of the portable information terminal device. Accordingly, an increase of dissipation current due to the diversity reception scarcely affects the battery life. The increase of dissipation current caused by the diversity reception becomes no-problem, if the power source is supplied from the side of the personal computer when the personal computer is connected thereto. Since it does not permit the diversity reception to implement when the portable information terminal device is not connected to the personal computer or the power source of the personal computer connected thereto is off state, the increase of dissipation current namely deterioration of the battery life is capable of being prevented.

While preferred embodiments of the invention have been described using specific terms, such description is for illustrative purpose only, and it is to be understood that changes and variations may be made without departing from the spirit or scope of the following claims.

What is claimed is:

1. A portable information terminal device with a radio selective-calling receiver connectable to a computer device through a connector, comprising:

a first and a second radio receiving section; and control means for controlling a power source of said first and said second radio receiving sections together into an ON-state when said radio selective call receiver is connected to said computer device, and when said radio selective call receiver is not connected to said computer device, said control means controls the power source of one of said first and said second radio receiving sections selectively into the ON-state.

2. A portable information terminal device with a radio selective-calling receiver according to claim 1, wherein said control means comprises means for detecting a connection condition of said connector, and means for performing ON/OFF control of the power source of said first and said second radio receiving sections in accordance with detection result of said detection means.

3. A portable information terminal device with a radio selective-calling receiver according to claim 1, wherein said control means controls the power source of said first and said second radio receiving section together into the ON-state when said portable information terminal device is connected to said computer device and said computer device is in the ON-state, while wherein said control means controls the power source of one of said first and said second radio receiving sections selectively into ON-state when said computer device is in an OFF-state.

4. A portable information terminal device with a radio selective-calling receiver according to claim 2, wherein said control means controls the power source of said first and said second radio receiving section together into the ON-state when said portable information terminal device is connected to said computer device and when said computer device is in an ON-state, while wherein said control means controls the power source of one of said first and said second radio receiving sections selectively into the ON-state when said computer device is in the OFF-state.

5. A portable information terminal device with a radio selective-calling receiver according to claim 3, wherein said control means further comprises means for detecting an ON/OFF state of said power source of said computer device, and means for controlling ON/OFF control of the power source of said first and said second radio receiving sections in accordance with the detection result of the detection means.

6. A portable information terminal device with a radio selective-calling receiver according to claim 4, wherein said control means further comprises means for detecting the ON/OFF state of said power source of said computer device, and means for controlling ON/OFF control of the power source of said first and said second radio receiving sections in accordance with the detection result of the detection means.

7. A portable information terminal device with a radio selective-calling receiver according to claim 1, further comprising means for receiving power supplied from the power source of said computer device when said portable information terminal device with said radio selective-calling receiver is connected to said computer device.

8. A portable information terminal device with a radio selective-calling receiver according to claim 2, further comprising means for receiving power supplies from the power source of said computer device when said portable information terminal device with said radio selective-calling receiver is connected to said computer device.

9. A portable information terminal device with a radio selective-calling receiver according to claim 3, further comprising means for receiving power supplies from the power source of said computer device when said portable information terminal device with said radio selective-calling receiver is connected to said computer device.

10. A portable information terminal device with a radio selective-calling receiver according to claim 4, further comprising means for receiving power supplies from the power source of said computer device when said portable information terminal device with said radio selective-calling receiver is connected to said computer device.

11. A portable information terminal device with a radio selective-calling receiver according to claim 5, further comprising means for receiving power supplied from the power source of said computer device when said portable information terminal device with said radio selective-calling receiver is connected to said computer device.

12. A portable information terminal device with a radio selective-calling receiver according to claim 6, further comprising means for receiving power supplied from the power source of said computer device when said portable information terminal device with said radio selective-calling receiver is connected to said computer device.

* * * * *